United States Patent
Dore et al.

(10) Patent No.: US 8,991,148 B2
(45) Date of Patent: Mar. 31, 2015

(54) FUEL FEED DEVICE FOR AVIATION ENGINE

(75) Inventors: Bastien Dore, Paris (FR); Loïc Pora, Champagne sur Seine (FR)

(73) Assignee: SNECMA, Paris (FR)

( * ) Notice: Subject to any disclaimer, the term of this patent is extended or adjusted under 35 U.S.C. 154(b) by 960 days.

(21) Appl. No.: 13/087,745

(22) Filed: Apr. 15, 2011

(65) Prior Publication Data
US 2011/0253231 A1    Oct. 20, 2011

(30) Foreign Application Priority Data
Apr. 15, 2010 (FR) ..................... 10 52884

(51) Int. Cl.
*F02C 9/00*      (2006.01)
*F02C 1/00*      (2006.01)
(Continued)

(52) U.S. Cl.
CPC .............. *F02C 9/263* (2013.01); *F01D 21/02* (2013.01); *F02C 7/232* (2013.01); *F05D 2260/601* (2013.01)
USPC .................... 60/39.281; 60/39.091; 60/39.13; 60/734; 60/790

(58) Field of Classification Search
USPC ........... 60/39.091, 39.13, 39.25, 39.281, 779, 60/790, 734
See application file for complete search history.

(56) References Cited

U.S. PATENT DOCUMENTS 3,511,259 A * 5/1970 Toure ........................... 137/114
3,901,025 A   8/1975 Bryerton et al.
(Continued)

FOREIGN PATENT DOCUMENTS

| EP | 0 802 310 A2 | 10/1997 |
| EP | 0 802 310 A3 | 10/1997 |

(Continued)

OTHER PUBLICATIONS

French Preliminary Search Report issued Nov. 23, 2010, in French 1052884, filed Apr. 15, 2010 (with English Translation of Category of Cited Documents).

(Continued)

*Primary Examiner* — William H Rodriguez
*Assistant Examiner* — Arun Goyal
(74) *Attorney, Agent, or Firm* — Oblon, McClelland, Maier & Neustadt, L.L.P.

(57) ABSTRACT

A jet pump (14) is inserted between the low-pressure pump and a high-pressure fuel pump (16). A fuel metering unit (20) includes a metering valve (22) which delivers a regulated fuel flow to a feed line (30), and a bypass valve (24) which diverts to a primary intake (14a) of the jet pump the excess fuel flow supplied by the high-pressure pump. An overspeed protection unit (50) includes a control element (54) of the bypass valve (24) which causes said to fully open in the event of an overspeed of the engine. A shutoff and pressurization checkvalve (42) is mounted on the feed line and controlled by a servo-valve (44) having a high-pressure port (44a) brought to the high fuel pressure, a low-pressure port brought to the pressure of the primary intake (14a) of the jet pump and an output setting the pressure in a control chamber (42a) of the shutoff valve (42) to a value between those prevailing at the high pressure and low pressure ports. In the event of overspeed, the restriction imposed by the jet pump causes a pressure rise at the primary intake of the jet pump, hence a pressure rise in the control chamber of the shutoff valve (42), favoring the closing thereof.

5 Claims, 2 Drawing Sheets

(51) Int. Cl.
*F02C 9/26* (2006.01)
*F01D 21/02* (2006.01)
*F02C 7/232* (2006.01)

(56) References Cited

U.S. PATENT DOCUMENTS

| | | | |
|---|---|---|---|
| 4,073,136 A | | 2/1978 | Symon |
| 4,339,917 A | | 7/1982 | LaGrone |
| 4,381,175 A | * | 4/1983 | Erickson .................. 417/80 |
| 5,884,483 A | | 3/1999 | Munro |
| 5,896,737 A | | 4/1999 | Dryer |
| 6,807,801 B2 | * | 10/2004 | McCarty .................. 60/39.094 |
| 7,007,452 B1 | | 3/2006 | Baryshnikov et al. |
| 2005/0279079 A1 | | 12/2005 | Baryshnikov et al. |
| 2007/0017206 A1 | | 1/2007 | Baryshnikov et al. |

FOREIGN PATENT DOCUMENTS

| | | |
|---|---|---|
| EP | 0 886 054 A2 | 12/1998 |
| EP | 0 886 054 A3 | 12/1998 |
| FR | 2 323 884 | 4/1977 |

OTHER PUBLICATIONS

U.S. Appl. No. 13/641,775, filed Oct. 17, 2012, Pora.

* cited by examiner

FUEL FEED DEVICE FOR AVIATION ENGINE

BACKGROUND OF THE INVENTION

The invention relates to a fuel feed device for an aviation engine, more particularly for a gas turbine propulsion engine for airplanes.

In known fashion, a fuel feed device for a combustion chamber of a gas turbine propulsion engine for airplanes includes a pumping unit providing fuel under high pressure to a fuel metering unit or FMU, which delivers a regulated flow of fuel to a fuel feed line of the combustion chamber.

The pumping unit typically includes a high-pressure fuel pump which supplies the FMU and which receives fuel from a low-pressure fuel pump connected to a fuel reservoir. The high-pressure pump is customarily driven by coupling to a gear in a mechanical gearbox or accessory gearbox (AGB) connected by a power takeoff to a turbine shaft.

The FMU typically includes a variable-position metering valve controlled by an engine control computer or engine control unit (ECU) according to the fuel delivery desired in the feed line. A bypass valve is connected so as to maintain a constant pressure difference $\Delta P$ between the inlet and the outlet of the metering valve and to divert to the intake of the high pressure pump the excess fuel delivered thereby. A shutoff and atomization check valve is mounted on the feed line and is controlled by a servo-valve so as to open when the pressure in the feed line reaches a predetermined threshold and to close when said pressure falls below the opening threshold or in response to a shutoff command issued by the cockpit or the ECU.

In an aviation gas turbine engine, excessive rotation speed of a turbine shaft can have severe consequences, to wit causing the rotor disks mounted on the shaft to burst. Hence such an engine is customarily equipped with an overspeed protection device which receives information representing the rotation speed of an engine shaft and sends a fuel feed shutoff command when said rotation speed exceeds a predetermined threshold.

The overspeed safety function is provided by an electronic overspeed protection unit which can be built into the same case as that housing the ECU or be independent of the ECU, and which controls a fuel feed shutoff control device. The shutoff can be achieved by commanding the bypass valve of the FMU fully open so as to divert the entire flow provided by the high pressure pump and induce the closure of the shutoff and pressurization checkvalve by dropping the pressure in the fuel feed line.

It is also known in the art to build a fuel pumping unit with a jet pump inserted between the low-pressure fuel pump and the high-pressure fuel pump. The high-pressure fuel stream diverted by the bypass valve of the FMU is injected into a nozzle of the jet pump and drives the fuel delivered by the low-pressure fuel pump which is admitted through an intake in the jet pump surrounding the nozzle. The high-pressure fuel pump receives fuel at a pressure with a value between the low pressure and the high pressure, which results in less need for tapping mechanical power to drive the high-pressure fuel pump.

It has become apparent that such a use of a jet pump in association with an overspeed protection unit operating as described above raises a difficulty. As it happens, for the contribution from the jet pump to be effective, the nozzle of the primary intake of the jet pump must have a rather small flow area, which results in a considerable restriction in the bypass fuel return circuit. In the event of full opening of the bypass valve caused by detection of an overspeed, the presence of this restriction causes a large increase in the pressure in the return circuit which penalizes the flow capacity of the bypass valve and prevents complete diversion of the high-pressure fuel flow discharged by the high-pressure fuel pump. A considerable fraction of this high-pressure flow therefore passes through the metering valve and maintains sufficient pressure in the feed line that the closing of the shutoff and pressurization checkvalve cannot be ensured. The addition of an additional shutoff valve dedicated to overspeed protection and controlled by the overspeed protection unit can be considered, but at the price of increased bulk and cost.

OBJECT AND SUMMARY OF THE INVENTION

The present invention aims to provide a fuel feed device equipped with an FMU associated with an overspeed protection unit and coupled to a jet pump which guarantees shutoff of fuel feed in the event that overspeed is detected, while still taking best advantage of the contribution offered by the presence of the jet pump during normal operation and without requiring a shutoff valve specifically dedicated to overspeed protection.

This goal is achieved thanks to a device including:
  a pumping unit including a low-pressure pump, a jet pump having a secondary intake arranged to receive low-pressure fuel discharged by the low-pressure pump and a high-pressure pump receiving the fuel discharged by the jet pump,
  a fuel metering unit including a regulated variable-opening metering valve arranged to receive fuel discharged by the high pressure pump and deliver a regulated fuel flow to an engine fuel feed line, and a bypass valve arranged to divert to an primary intake of the jet pump the excess fuel flow provided by the high-pressure pump,
  a shutoff and pressurization unit including a shutoff valve mounted on the feed line, and a servo-valve controlling the shutoff valve having a high-pressure port brought to the pressure of the fuel leaving the high-pressure pump, a low-pressure port brought to a pressure corresponding to that existing at the primary intake of the jet pump and a control output connected to a control chamber for closing the shutoff valve, to bring the pressure in the control chamber to a value between those existing at the high pressure and low pressure ports, and
  an overspeed protection unit including an element controlling the bypass valve arranged to cause the complete opening thereof in response to the detection of an engine overspeed.

Thus, as will appear later in the detailed description, an increase of pressure at the primary intake of the jet pump due to the opening of the bypass valve in response to a detection of overspeed results in an increase in pressure at the low-pressure port of the servo-valve controlling the shutoff and pressurization checkvalve, hence to an increase in pressure in the control chamber of the shutoff valve, ensuring the closing thereof.

The low pressure port of the servo-valve of the shutoff and pressurization unit can be directly connected to a return line connected between the bypass valve and the primary intake of the jet pump.

For other hydraulic or electro-hydraulic control elements, the low pressure discharge of the low-pressure fuel pump can continue to be used as a low-pressure reference. Thus the control element of the overspeed shutoff unit can be a solenoid valve having one intake brought to the output pressure of the low-pressure pump and one outlet connected to a control chamber of the bypass valve.

The invention also applies to an aviation engine equipped with such a fuel feed device.

BRIEF DESCRIPTION OF DRAWINGS

The invention will be better understood upon reading the description given hereafter with reference to the appended drawings, in which.

DETAILED DESCRIPTION OF EMBODIMENTS OF THE INVENTION

Embodiments of the invention will be described hereafter within the framework of an application to a twin-spool gas turbine engine for airplane propulsion such as that shown very schematically in FIG. 1, the invention being applicable, however, to other airplane engines, for example single spool gas turbine engines or those with more than two spools.

Figure 1:
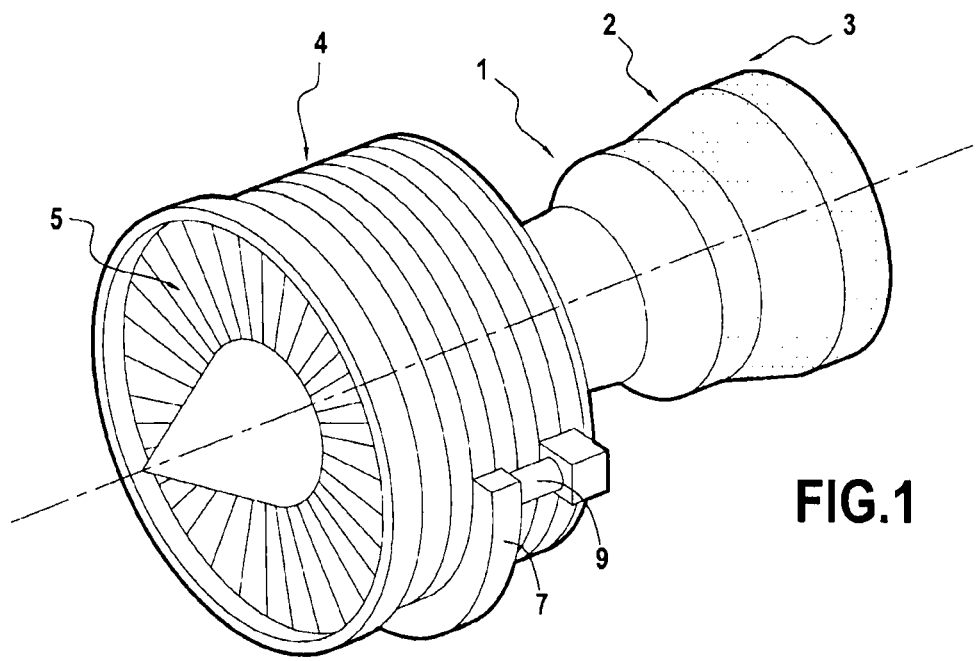
FIG. 1 is a very schematic view of a gas turbine airplane propulsion engine.

The engine in FIG. 1 includes a combustion chamber 1, the combustion gases issuing from chamber 1 driving a high-pressure (HP) turbine 2 and a low-pressure (LP) turbine 3. The HP turbine 2 is coupled by a HP shaft to a HP compressor 4 feeding air under pressure to the combustion chamber while the LP turbine 3 is coupled to a blower 5 at the engine intake by means of a LP shaft coaxial with the HP shaft.

An accessory gearbox or AGB 7 is connected by a mechanical power take-off to a turbine shaft and includes a gear assembly for driving various accessories such as pumps, one or more starter/generators, one or more permanent-magnet generators, . . . .

Figure 2:
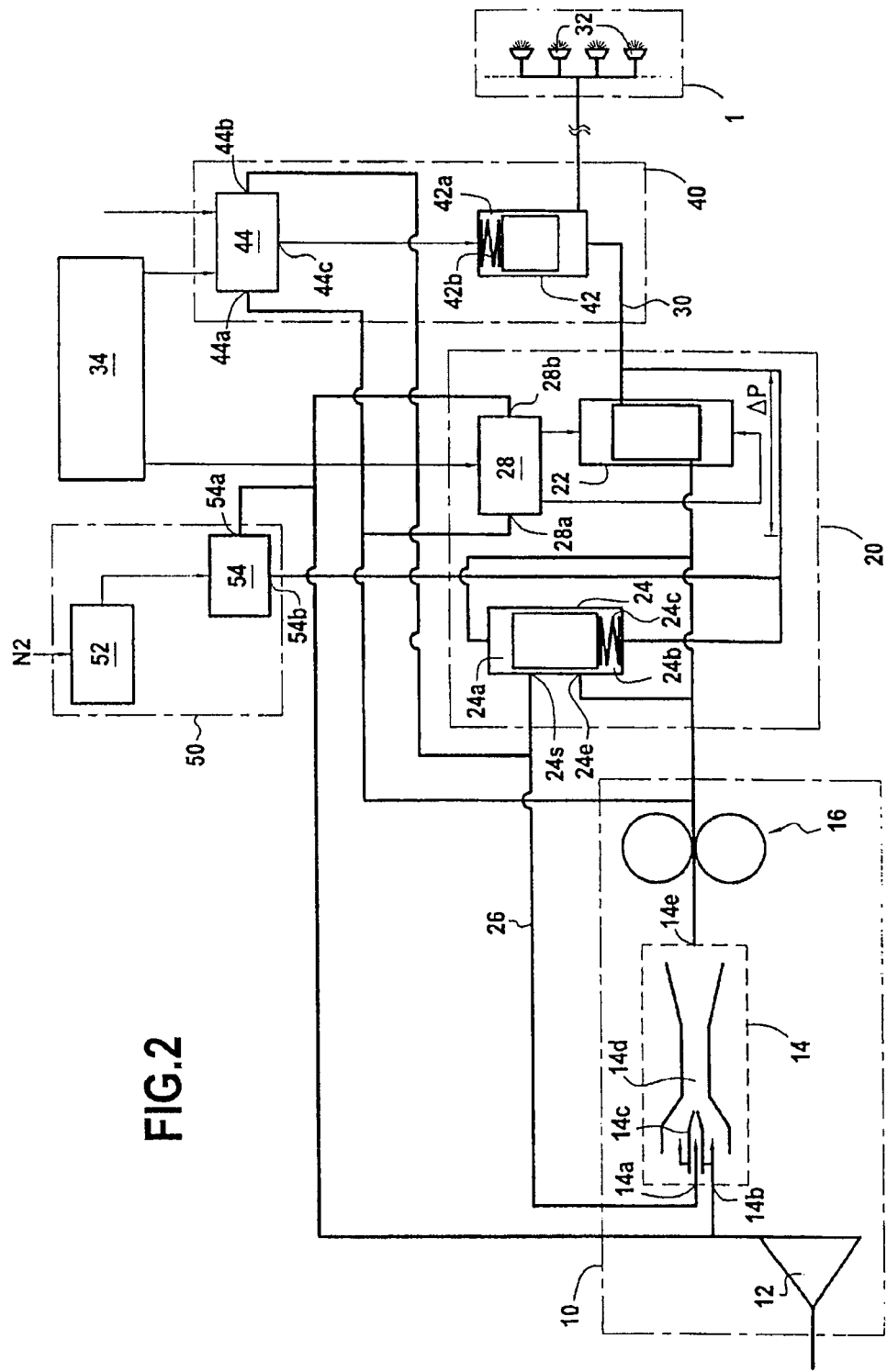
FIG. 2 shows schematically a fuel feed device for an engine such as for example that of FIG. 1 with an FMU coupled to a jet pump and an overspeed shutoff unit, according to an embodiment of the invention.

FIG. 2 is a schematic diagram of a fuel feed device for an engine such as for example that of FIG. 1, according to an embodiment of the invention.

The device in FIG. 2 includes a pumping unit 10 and a fuel metering unit or FMU 20 receiving high-pressure fuel issuing from the pumping unit 10 and delivering a regulated flow of fuel to a fuel feed line 30 carrying fuel to injectors 32 of the combustion chamber 1 of the engine. A shutoff and pressurization unit 40 includes a shutoff valve 42 mounted on line 30 and controlled by a servo-valve 44. An overspeed protection unit 50 includes an electronic overspeed protection circuit 52 which generates a shutoff signal transmitted to a control element 54 to cause an interruption of fuel feed to the combustion chamber in the event that overspeed is detected.

The pumping unit 10 includes a low-pressure fuel pump 12 which receives fuel coming from a reservoir (not shown) and provides low-pressure fuel to a secondary intake 14b of a jet pump 14. The intake 14b has an annular cross-section surrounding an primary intake 14a made up of the upstream part of a nozzle 14c which, at least in its downstream part, has a decreasing flow cross-section. The primary intake 14a receives a flow of diverted high-pressure fuel from the FMU and constituting the primary flow which mixes with the entrained secondary flow of low-pressure fuel in a mixing region 14d within the jet pump. A high-pressure fuel pump 16 receives the fuel issuing from the outlet 14e of the jet pump and delivers high-pressure fuel to the FMU. The jet pump constitutes an intermediate pressure elevation stage allowing the mechanical power demand for driving the high-pressure fuel pump to be reduced at equal HP fuel pump delivery pressure.

The FMU 20 includes a metering valve 22 the outlet whereof is connected to the feel line 30 and a bypass valve 24 the outlet whereof 24s is connected to the primary intake of the jet pump 14 via a return line 26. The outlet of the high-pressure fuel pump 16 is connected both to the intake of the metering pump 22 and to the inlet 24e of the bypass valve 24. The latter has a first control chamber 24a brought to the output pressure of the high-pressure fuel pump 16 and a second control chamber 24b having an input port connected with the output of the metering valve 22 so as to maintain, between the input and the output of the metering valve 22, a substantially constant pressure difference ΔP depending on a loading spring 24c incorporated into the chamber 24b of the bypass valve 24. The position of the metering valve 22, which determines the delivery of fuel provided through line 30, is controlled by a servo-valve 28. The servo-valve 28 has a high-pressure port 28a brought to the output pressure of the high-pressure fuel pump 16, a low-pressure port 28b connected to the output of the low-pressure fuel pump 12 and is controlled by an engine control unit or ECU 34 so as to position the metering valve 22 according to a flow set point to be delivered to the combustion chamber.

The shutoff valve 42 is mounted on line 30 downstream of the metering valve 22. The shutoff valve 42 is brought to the closed position to interrupt fuel feed to the combustion chamber in response to a shutoff command received by the servo-valve 44 from the ECU 34 or from the cockpit of the airplane, or when the pressure in the fuel feed line 30 is below a predetermined opening threshold. The servo-valve 44 has a high-pressure port 44a, a low-pressure port 44b and a control output 44c which is connected to a control chamber 42a of the shutoff valve to apply to it a pressure modulated between the pressures present at ports 44a, 44b. The servo-valve 44 is positioned so that the pressure in the control chamber, plus the force exerted by the return spring 42b, corresponds to the predetermined opening threshold, that is to the fuel pressurization threshold allowing fuel feed to the combustion chamber to start.

The high-pressure port 44a of the servo-valve 44 is brought to the output pressure of the high-pressure fuel pump 16. In known fashion, a heat exchanger (not shown) can be inserted in the line feeding the port 44a of the servo-valve 44 and the port 28a of the servo-valve 28. The low-pressure port 44b of the servo-valve 44 is brought to a pressure representing the output pressure of the bypass valve 24, for example by simply being connected to the return line 26.

The electronic overspeed protection circuit 52 is, in the illustrated example, built into a separate case from that housing the ECU 34. As a variation, the circuit 52 could be built in with the ECU in the same case. The circuit 52 receives information representing the engine operating point, for example information representing the rotation speed N2 of the HP shaft of the engine. When the speed N2 exceeds a maximum threshold N2max, the electronic circuit 52 generates a shutoff signal transmitted to the control element 54. The latter is for example in the form of a solenoid valve which, in response to the shutoff signal, connects an input 54a, brought to the output pressure of the low-pressure fuel pump 12, with an output 54b connected with the input port of the control chamber 24b of the bypass valve 24.

The operation is as follows.

In the event that overspeed is detected, the opening of the solenoid valve 54 causes full opening of the bypass valve 24. The restriction created by the nozzle 14c of the jet pump 14 causes a large increase in the pressure in the return line 26, which results in an immediate increase of the modulated pressure in the control chamber 42a of the shutoff valve 42, due to the increase in pressure at the low pressure port 44b of the servo-valve 44, and causes the closing of the shutoff valve 42 with the help of the spring 42b.

In normal operation (no overspeed), the fuel flow diverted by the bypass valve 24 being relatively small, the pressure at the low-pressure port 44b of the servo-valve 44 is only slightly higher than the output pressure of the low-pressure fuel pump 12. A configuration similar to that in the prior art therefore exists, in which the low-pressure port of the shutoff and pressurization checkvalve control servo-valve is connected to the output of the low-pressure fuel pump so that, compared to the prior art, the design principles of the elements providing the shutoff and pressurization functions are unchanged. In the event of a shutoff command coming from the cockpit or from the ECU 34, the servo-valve 44 applies to the control chamber 42a of the shutoff valve 42 the pressure prevailing at its high-pressure port 44a, which causes the closing of the shutoff valve 42 with the help of the spring 42b.

For the servo-valve 28 controlling the metering valve 22 and for the solenoid valve 54, the low-pressure reference remains that available at the output of the low-pressure fuel pump 12.

Figure 3:
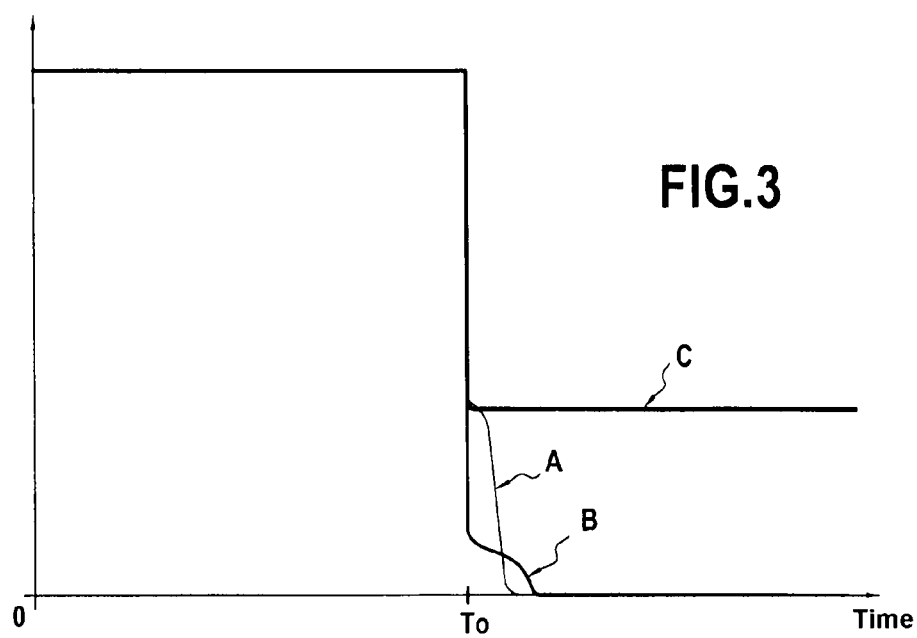
FIG. 3 shows the variation of fuel delivery to the engine in the event of detection of an overspeed with the feed device of FIG. 2, a prior art device differing from that of FIG. 2 by the absence of the jet pump and a device differing from that of FIG. 2 by the use of the low fuel pressure at the low-pressure port of the shutoff and pressurization checkvalve control servo-valve.

In FIG. 3, curves A, B and C show the time variations of the fuel flow injected into the combustion chamber, with output at time $T_o$ of a shutoff signal upon detection of an overspeed, in the following cases:

Curve A: fuel feed device according to the invention as described earlier,

Curve B: prior art device differing from that described earlier by the absence of a jet pump, the low-pressure port of the shutoff and pressurization checkvalve control being connected to the output of the low-pressure fuel pump, Curve C: device differing from the invention described earlier by the connection of the low-pressure port of the servo-valve of the shutoff and pressurization checkvalve to the output of the low-pressure fuel pump.

It is observed that the performance of the device according to the invention in the event of overspeed is similar to that of the prior art device (Curve B) with quasi-instantaneous shutoff of fuel supply in the event that overspeed is detected.

On the other hand, in the case corresponding to Curve C, the closing of the shutoff and pressurization checkvalve does not occur in the event of an overspeed, the pressure in the feed line due to the residual non-diverted flow being too great with respect to that applied at the output of the servo-valve 44.

The invention claimed is:

1. A fuel feed device for an aviation engine, comprising:
   a pumping unit including a low pressure pump, a jet pump having a secondary intake configured to receive low-pressure fuel issuing from the low-pressure pump and a high-pressure pump receiving the fuel issuing from the jet pump,
   a fuel metering unit including a regulated variable opening metering valve configured to receive fuel issuing from the high-pressure pump and deliver a regulated fuel flow to an engine fuel feed line, and a bypass valve configured to divert to an primary intake of the jet pump an excess fuel flow supplied by the high-pressure pump,
   a shutoff and pressurization unit including a shutoff valve mounted on the feed line, and a shutoff valve control servo-valve having a high-pressure port brought to a pressure of the fuel leaving the high-pressure pump, a low-pressure port brought to a pressure corresponding to that prevailing at the primary intake of the jet pump, and a control output connected to a control chamber of the shutoff valve to increase a pressure in the control chamber to a value between those prevailing in the high pressure and low pressure ports, and
   an overspeed protection unit including a control element of the bypass valve configured to cause the complete opening thereof in response to a detection of an engine overspeed.

2. A device according to claim 1, wherein the low-pressure port of the servo-valve of the shutoff and pressurization unit is connected directly to a return line connected between the bypass valve and the primary intake of the jet pump.

3. A device according to claim 1, wherein the control element of the overspeed protection unit is a solenoid valve having an inlet brought to an output pressure of the low-pressure pump and an outlet connected to a control chamber of the bypass valve.

4. An aviation engine equipped with a device according to claim 1.

5. A device according to claim 1, wherein the control output is connected to only the control chamber of the shutoff valve to bring the pressure in the control chamber to the value between those prevailing in the high pressure and low pressure ports.

* * * * *